United States Patent [19]

Hare et al.

[11] 3,788,370
[45] Jan. 29, 1974

[54] PARTICULATE SOLIDS TUBE LOADING APPARATUS

[75] Inventors: Thomas R. Hare, Oakland; Clifford C. Segerstrom, Lafayette, both of Calif.

[73] Assignee: Shell Oil Company, Houston, Tex.

[22] Filed: Feb. 10, 1972

[21] Appl. No.: 225,257

[52] U.S. Cl. ............... 141/125, 141/238, 141/264, 222/429
[51] Int. Cl. ............................................. B65b 1/06
[58] Field of Search ........... 222/426, 428, 429, 438; 141/250, 263, 264, 236, 237, 238, 242, 244, 115, 121, 125

[56] References Cited
UNITED STATES PATENTS

| 261,941 | 8/1882 | McCrodden | 141/244 |
|---|---|---|---|
| 1,267,201 | 5/1918 | Fleming et al. | 141/238 |
| 1,488,603 | 4/1924 | Kouwenhoven | 141/238 |
| 2,770,395 | 11/1956 | Sebardt | 222/438 X |
| 3,380,633 | 4/1968 | Du Bois | 141/238 X |

*Primary Examiner*—Houston S. Bell, Jr.
*Assistant Examiner*—Charles Gorenstein
*Attorney, Agent, or Firm*—Howard W. Haworth

[57] ABSTRACT

Vertical tubes are expeditiously filled to a predetermined depth with flowable, particulate solids by an apparatus which comprises (a) a temporary storage reservoir for the flowable, particulate solids; (b) conveying means for supplying the temporary storage reservoir with flowable, particulate solids; (c) an overflow reservoir supported by and vertically below the temporary storage reservoir; (d) a temporary storage reservoir flow control means for regulating the quantity of flowable, particulate solids passing out of the temporary storage reservoir and into the overflow reservoir; (e) at least one vertically oriented measuring tube secured to and passing through the bottom of the overflow reservoir, which measuring tubes are (i) located beneath the temporary storage reservoir flow control means; (ii) open at their upper ends for the receipt of flowable, particulate solids which pass through the temporary storage reservoir flow control means; and (iii) restricted at their lower ends by a measuring tube flow control means, to which an outlet nozzle of variable, restricted flow area is attached; (f) screeding means for leveling the flowable, particulate solids within the measuring tube; (g) positioning means for locating the outlet nozzles above the vertical tubes to be filled with flowable, particulate solids; and (h) conveying means for removing excess flowable, particulate solids collected in the overflow reservoir.

12 Claims, 3 Drawing Figures

PARTICULATE SOLIDS TUBE LOADING APPARATUS

BACKGROUND OF THE INVENTION

1. Field of the Invention

This invention relates to an apparatus and method for filling vertical tubes to a predetermined depth with flowable, particulate solids.

2. The Prior Art

The contacting of fluids, whether as liquids, gases, or two-phase mixtures, with solids is a common step in modern chemical processes. For example, gaseous and/or liquid reactants are selectively converted to desired products by contacting with suitable catalysts; product streams are purified of contaminants by contacting with solid selective adsorbants; objectionable, ionic species are removed from liquids by contacting with solid ion exchange resins; and gases and liquids are dried by contacting with solid desiccants. Not infrequently, such contacting operations are accompanied by sizeable heat effects. To maintain the solid at full working capacity, and to avoid complications in the fluid being processed, the solid contacting material is frequently loaded within a plurality of tubes around which a suitable heat transfer medium circulates. By appropriate manifolding, the fluid to be treated is passed through the tubes, with the generated or required heat being removed or supplied, respectively, by the circulating heat transfer medium.

Economies of scale have required a substantial increase in the size of the equipment in which such contacting operations are conducted, as well as the number of pieces of such equipment within a particular chemical plant. Where the fluid-solid contacting device contains thousands, or even tens of thousands of tubes, as is not uncommon in modern large scale chemical processes, desired economies of scale can be detrimentally offset by the costs of loading and unloading the solid contacting material from the tubes, as well as by major losses in productivity which occur during the lengthy period the fluid-solid contacting device is out of service for solids loading and unloading.

In the past it was conventional to place, in effect, a funnel at the upper end of each tube to be filled and pour the flowable, particulate solid into the individual tubes. Except for very specialized applications, such a procedure is unacceptable today because of the large number of tubes which have to be filled.

To a certain extent, this "funnel-filling" technique has been semi-automated by Sacken et al., U.S. Pat. No. 3,223,490 (issued Dec. 14, 1965). Sacken et al discloses a tube filling device which consists of (a) a rimmed, perforated plate which rests on the tubes to be filled, the drilled perforations corresponding to the pattern and spacing of the tubes to be filled; and (b) a fill tube (in effect, a funnel), one for each of the many tubes to be filled, which nests in the perforated plate and extends into the tube to be filled. In operation, catalyst is dumped onto the perforated plate, the plate is shaken, and the flowable solid, one particle at a time, passes through the fill tubes and into the tubes to be loaded. The difficulties with such a catalyst loading system include: (a) inflexibility, in that a perforated plate and its associated fill tubes can only be used to load a fluid-solid contacting device tube bundle having the same number, pattern, spacing, and diameter of tubes which correspond to the holes drilled in the rimmed, perforated plate; (b) the inordinate amount of set-up time required to slip thousands of individual fill tubes through the plate perforations and into the upper ends of tubes to be filled; and (c) the inability to reproducibly fill the vertical tubes with strata of flowable, particulate solids comprising a mixture of two or more similar or dissimilar species, for example, catalyst mixed with varying proportions of an inert solid diluent, where the lengths of strata in one vertical tube is duplicated in all other vertical tubes in the tube bundle.

BRIEF SUMMARY OF THE INVENTION

It has now been found that vertical tubes may be filled to a predetermined depth with flowable, particulate solids with an apparatus which comprises (a) a temporary storage reservoir for the flowable, particulate solids; (b) conveying means for supplying the temporary storage reservoir with flowable, particulate solids; (c) an overflow reservoir supported by and vertically below the temporary storage reservoir; (d) a temporary storage reservoir flow control means for regulating the quantity of flowable, particulate solid passing out of the temporary storage reservoir and into the overflow reservoir; (e) at least one vertically-oriented measuring tube secured to and passing through the bottom of the overflow reservoir, which measuring tubes are (i) located beneath the temporary storage reservoir flow control means; (ii) open at their upper ends for th receipt of flowable, particulate solids which pass through the temporary storage reservoir flow control means, and (iii) restricted at their lower ends by a measuring tube flow control means, to which an outlet nozzle of variable, restricted flow area is attached; (f) screeding means for leveling the flowable, particulate solids within the measuring tube; (g) positioning means for locating the outlet nozzles above the vertical tubes to be filled with flowable, particulate solids; and (h) conveying means for removing excess flowable, particulate solids collected in the overflow reservoir.

DETAILED DESCRIPTION OF THE DRAWINGS AND INVENTION

For the purpose of facilitating an understanding of the invention, the accompanying drawings illustrate a preferred embodiment thereof. While one form of the invention is described in considerable detail in connection with the drawings, it will be understood by those skilled in the art that numerous modifications can be made thereto without departing from the scope of the invention.

Figure 1:
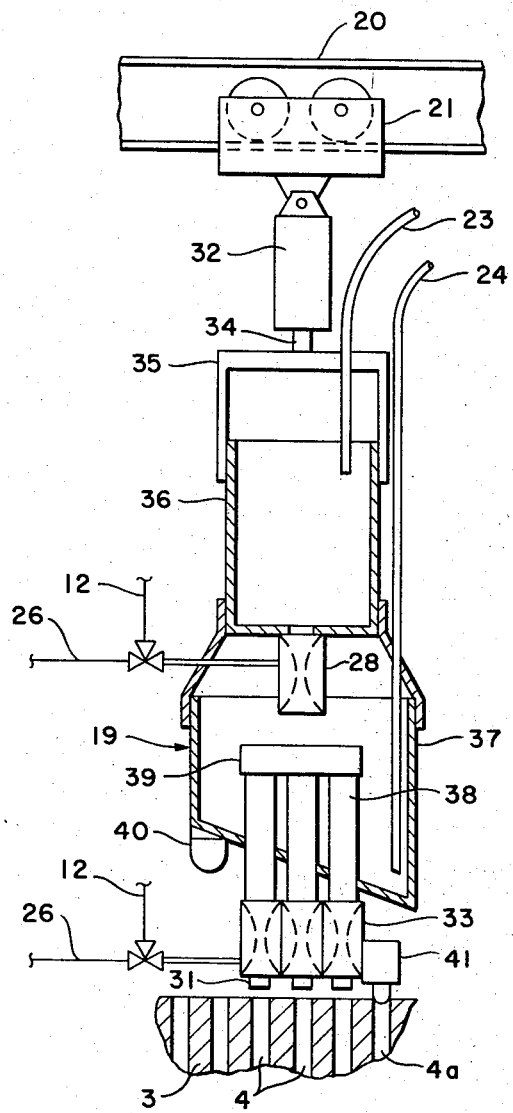
FIG. 1 is a simplified diagramatic, cross sectional view of one embodiment of the present invention, containing for purposes of clarity, three measuring tubes.

In FIG. 1, the flowable, particulate solids loading apparatus 19 is shown with three measuring tubes 38. The apparatus consists of a temporary storage reservoir 36, which is supplied with flowable, particulate solids via conveying means 23. Overflow reservoir 37 is suspended from and vertically below temporary storage reservoir 36. The passage of flowable, particulate solids from temporary storage reservoir 36 to overflow reservoir 37 is regulated by temporary storage reservoir flow control means 28, for example a pinch valve, butterfly valve, or the like. Temporary storage reservoir flow control means 28 preferably consists of a pneumatically-activated pinch valve. As illustrated, temporary storage reservoir flow control means 28 is actuated by air and vacuum lines 26 and 12, respectively, in conjunction with a 3-way valve. Secured to and passing through the bottom of overflow reservoir 37 is at least one vertically oriented measuring tube 38, three of which are shown in FIG. 1. As indicated in FIG. 1, measuring tubes 38 are (a) located beneath temporary storage reservoir flow control means 28, are (b) open at their upper ends for the receipt of flowable, particulate solids which pass through flow control means 28, and are (c) restricted at their lower ends by measuring tube flow control means 33. Suitable deflectors (not shown in FIG. 1) may be positioned below temporary storage reservoir flow control means 28 and above measuring tubes 38, to assist in achieving a uniform distribution of flowable, particulate solids to all the measuring tubes. Measuring tube flow control means 33 may also be a pinch valve, a butterfly valve, or similar type of device, and as illustrated are actuated by air and vacuum lines 26 and 12, respectively, in conjunction with a 3-way valve. In a preferred embodiment, measuring tube flow control means 33 are pneumatically-actuated pinch valves. Attached to the lower end of measuring tube flow control means 33 are outlet nozzles 31 of variable, restricted flow area. As used herein, "variable, restricted flow area" means that the diameter of outlet nozzles 31 may be varied to match the diameter of vertical tubes 4 within a given tube bundle by installing a different set of such nozzles. Such outlet nozzles preferably have a diameter no larger than that of the vertical tubes to be filled.

Each loading apparatus 19 contains one or more measuring tubes 38. In a preferred embodiment of the present invention, two devices such as that shown in FIG. 1 are used to fill a vertically oriented fluid-solid contacting device tube bundle with flowable, particulate solids. One of these apparatuses will have a plurality of measuring tubes 38, for example, 4, 9, 25, 36, etc.; the number of measuring tubes 38 is not critical for proper operation of the apparatus. The other loading apparatus will contain a single measuring tube 38. Working in conjunction, the loading device containing the plurality of measuring tube 38 will be employed to fill most of the tubes in a fluid-solid contacting device tube bundle. The loading apparatus containing but a single measuring tube 38 is used to load those vertically oriented tubes around and near the periphery of the tube bundle which are not filled by the loading apparatus containing a plurality of measuring tubes.

Where the apparatus illustrated in FIG. 1 is to be used for loading a single fluid-solid contacting device, measuring tubes 38 may be affixed permanently to the bottom of overflow reservoir 37. Alternatively, if it is desired to employ the loading apparatus of the present invention in a number of different locations, different, removable sets of measuring tubes, having variable volumes and outlet nozzle spacings, may be secured to and passed through the bottom of overflow reservoir 37.

Positioning means for locating loader 19 over tubesheet 3 and vertical tubes 4 of a fluid-solid contacting device can be varied, but as shown include: (a) a trolley means 21 suspended from a jib crane 20, having such a length and swing to permit location of outlet nozzles 31 above any vertical tube 4 to be filled with flowable, particulate solids; (b) swivel means 34 and lifting means 32, for rotating the apparatus in a horizontal plane and for raising and lowering the apparatus, respectively; and at least one vertically oriented, locating detent 41, affixed to the bottom of loading apparatus 19 and extending downward at least to the horizontal plane formed by the ends of outlet nozzles 31, which vertically oriented locating detents nest in tubes 4a adjacent to those which are being filled with a flowable, particulate solid. Loading apparatus 19 may be moved from one fluid-solid contacting device location to another by lifting it via bale 35.

Operation of the apparatus of the present invention proceeds as follows. A predetermined amount of flowable, particulate solids enters temporary storage reservoir 36 through conveying means 23. After temporary storage reservoir 36 has been filled, temporary storage flow control means 28 is opened, permitting flowable, particulate solids to rain down on and fill measuring tubes 38. The level of flowable, particulate solids within measuring tubes 38 is maintained constant by removing excess material from the tops thereof. This is conveniently accomplished by one or a combination of screeding means, for example, doctor blades, wiping elements, shakers, knockers, vibrators, and the like. In a preferred embodiment, a manually-, air-, or electrically-operated doctor blade assembly 39 removes flowable, particulate solids from the top of measuring tubes 38. Such solids collect at the bottom of overflow reservoir 37, and a removed therefrom, under the influence of vacuum, through conveying means 24. To assist in the removal of flowable, particulate solids from overflow reservoir 37, the bottom thereof is sloped from one side to the other, as shown in FIG. 1, or alternatively, is sloped from its center to its periphery. The movement of solids collected at the bottom of overflow reservoir 37 to conveying means 24 may be further assisted by the use of a suitable vibrator 40.

After measuring tubes 38 have been filled with flowable, particulate solids and the excess screeded therefrom, measuring tube flow control means 33 are opened, thus permitting the flowable, particulate solids to pass through outlet nozzles 31 into vertical tubes 4 over which apparatus 19 has been positioned. The volume of flowable, particulate solids which can be loaded into measuring tubes 38 will, in general, be considerably less than that required to completely fill vertical tubes 4. Thus, it is typically necessary to fill measuring tubes 38 a number of times and dump their contents into tubes 4. The length and diameter of measuring tubes 38 may be varied such that an integral number of loading cycles is required to fill tubes 4. To obtain extremely fine adjustment of the volume of flowable, particulate solids which fill measuring tubes 38, a volume-varying collar, which fits onto the upper ends of measuring tube 38 in a sleeve-like manner, may be employed. This collar will have the same cross-sectional shape as that of the one or more measuring tubes 38, that is, round, square, hexagonal, and the like, and are secured to the measuring tube or group of tubes by wing nuts, clamps, etc. In a preferred embodiment, such volume-varying collar forms the lower portion of doctor blade assembly 39. In this arrangement, a doctor blade is moved across the upper, open surface of such volume-varying collar, filling the collar and the measuring tubes associated therewith, and screeding excess flowable, particulate solids from the tops thereof.

Where it is desirable to load a flowable, particulate solid containing a single species into vertical tubes 4, such filling proceeds as hereinabove outlined. In certain chemical processing steps, however, it is desirable to contact the fluid with a solid comprising two or more species, whose concentrations vary in the direction of fluid flow. For example, certain exothermic chemical reactions are conducted by contacting a liquid or gas with a mixture of catalyst and inert solid diluent, the concentration of catalyst increasing in the direction of flow and the concentration of inert solids decreasing. With the apparatus of the present invention, the loading of tubes with a flowable, particulate solid in strata of varying catalyst and solid inerts, is readily accomplished. Thus, measuring tubes 38 are filled and dumped a predetermined number of times with a suitable mixture of catalyst and solid inerts. Then, that type of flowable, particulate solids is removed from the system and a mixture containing a different proportion of catalyst and solid inerts is fed. In this manner, strata of varying concentration may be loaded into tubes 4.

Figure 2:
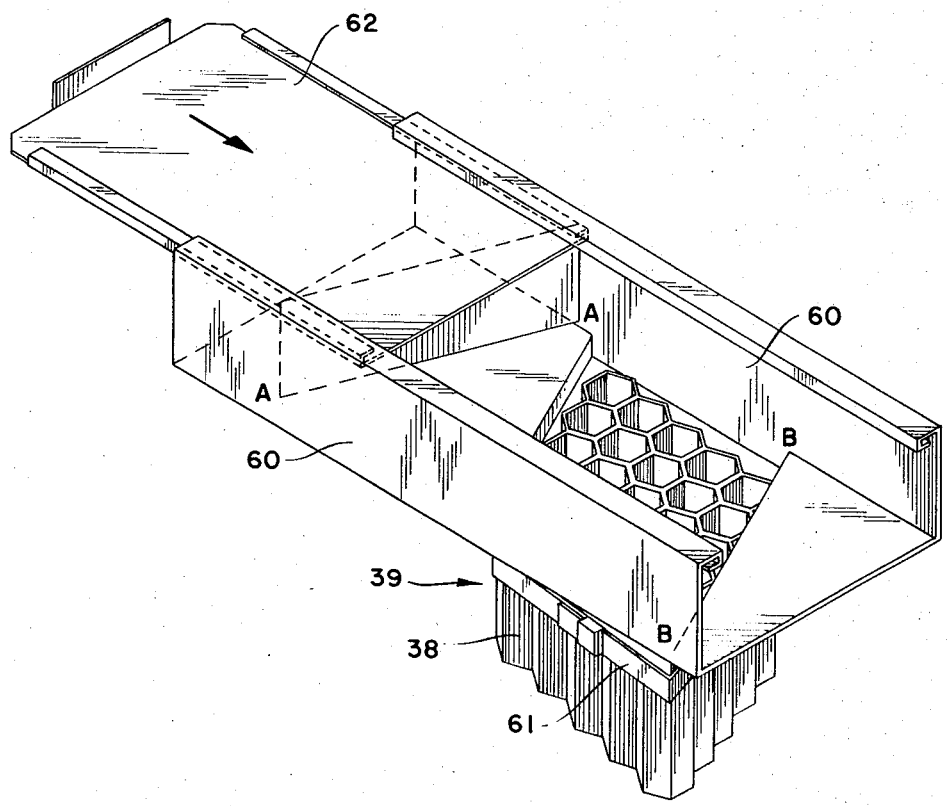
FIG. 2 is a simplified, isometric view of (a) a doctor blade assembly, which may be employed in the apparatus of the present invention as means for screeding flowable, particulate solids within measuring tubes; and (b) a volume-varying collar for precisely controlling the quantity of flowable, particulate solids loaded into and delivered by one discharge cycle of the measuring tubes.

FIG. 2 illustrates one embodiment of a screeding means for leveling solids in and removing excess solids from the tops of measuring tubes 38. Doctor blade assembly 39 comprises volume-varying collar 61, guide rails 60, and doctor blade 62. As shown in FIG. 2, volume-varying collar 61 communicates with measuring tubes 38 by slipping over the latter's open, upper ends in a sleeve-like manner; however, the manner of securing the collar to the measuring tubes is not critical.

The screeding means illustrated in FIG. 2 may be employed with single or multi-tube loaders of the present invention. By way of illustration, the assembly shown in FIG. 2 is used with a multi-tube loader containing 25 measuring tubes 38 of hexagonal cross section. The volume-varying collar will have the same shape, for example, square, hexagonal, etc. as the group of measuring tubes 38. The measuring tubes may be raised or lowered with respect to this collar to achieve precise control of the amount of solids loaded in and above the tubes.

After flowable, particulate solids have been distributed onto the top of doctor blade assembly 39, optionally with the assistance of suitable deflectors, doctor blade 62 is pushed or pulled across the top surface of the volume-varying collar. This may be accomplished manually, or by suitable pneumatic or electrical means. Such movement of the doctor blade levels the solids above the measuring tubes and removes any excess.

Generally, the vertical tubes (not shown in FIG. 2) to be filled with flowable, particulate solids will be arranged in a triangular or square pattern. Accordingly, the shape formed by the periphery of the measuring tubes, taken as a unit, and their associated volume-varying collar may be described as a rhombus. In a preferred embodiment, the doctor blade is moved across the tops of the volume-varying collar in a direction parallel to one side of that rhombus. In another preferred embodiment, the leading edge of doctor blade 62, surface A—A, is arranged at an angle other than 90° to the direction of doctor blade movement. Using such a configuration, flowable, particulate solids are "peeled off" edge B—B of collar 61 successively, rather than all at once, thereby avoiding jamming of the doctor blade and attrition of screeded solids.

Shearing of flowable, particulate solids during the screeding process may be further minimized, when employing the assembly shown in FIG. 2, by supporting doctor blade 62 on guide rails 60 such that a slight gap is maintained between the upper surface of volume-varying collar 61 and the lower surface of doctor blade 62. Generally, the spacing between these two horizontal surfaces will be between about 0.1 and about 0.75 inches or more. The extent of the gap between such surfaces will depend upon the particle size of the solids being processed. Suitable sweeping means, for example, brushes, flexible strips, and the like, extending into the gap, may be affixed to the underside of doctor blade 62 to insure adequate screeding action.

Figure 3:
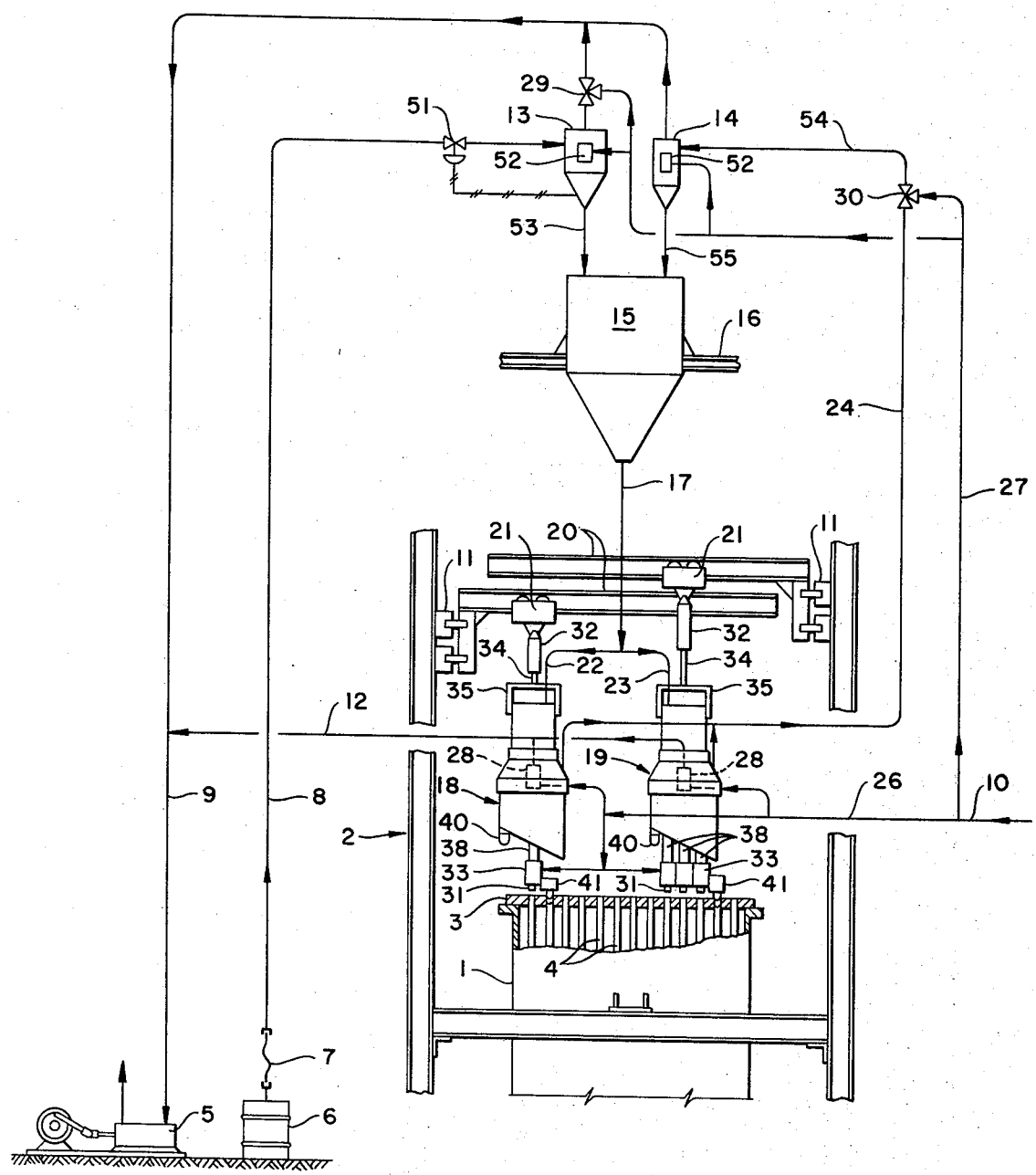
FIG. 3 is a simplified elevational view illustrating the use of single- and multi-tube loading apparatuses in the filling of a vertically oriented, fluid-solid contacting device tube bundle.

FIG. 3 illustrates one embodiment of a system for filling a fluid-solid contacting device tube bundle with flowable, particulate solids with the apparatus of the present invention. In FIG. 3, fluid-solid contacting device 1, containing tubes 4 which terminate at tubesheet 3, is maintained in position by structural support 2. To expedite the installation and removal of the loading facilities they may be designed for maximum portability. To this end hopper 15, primary solids receiver 13, recycle solids receiver 14, their appurtenances and controls may be mounted on structural frame 16, which is designed to span and rest on the upper cord of support structure 2. Structural frame 16 may have lifting eyes for easy handling and a catwalk for ready access to the operating components. Loading apparatuses 18 and 19, fitted with a single and a plurality of measuring tubes 38, respectively, have bales 35 to expedite moving them. Jib cranes 20 may be readily mounted by lifting them to position and inserting hinge pins in crane brackets 11. The crane brackets will be permanently installed and, thus, two sets will be required for each fluid-solid contacting device.

As illustrated, loading of tubes 4 with a flowable, particulate solid, comprising one or more species, proceeds as follows. Starting at container 6 of flowable, particulate solids delivered to the fluid-solid contacting device site at ground level, the particles are picked up with a vacuum-activated and manually-placed, pick-up wand 7 and conveyed to primary solids receiver 13 through line 8. Flowable, particulate solids are conveyed to primary receiver 13 by subjecting that vessel to a vacuum supplied by portable vacuum pump 5 and transmitted thereto through line 9 and 3-way valve 29. Flowable, particulate solids accumulate in primary solids receiver 13 until such time as, for example, its weight reaches a predetermined value or the solids rise to a predetermined level. At this time, a trip, which may be integral with primary receiver 13, automatically (a) closes 3-way valve 29, thus isolating the vessel from vacuum source 5 and flow control means 51 in conveying line 8 and (b) opens primary receiver 13 to the atmosphere through a branch in line 8 (not shown). This breaks the vacuum in primary receiver 13, causing the receiver dump valve 52, actuated by air supplied thru line 10 and manifold 27, to open. Accumulated flowable, particulate solids thus drop into hopper 15 through line 53. Dump valve 52 then closes and the cycle repeats itself. Should flowable, particulate solids be dumped into hopper 15 faster than they are withdrawn and thus build up sufficient height to cause contact with dump valve 52, flow through the valve stops and the conveying cycle discontinues. Conveying of flowable, particulate solids through line 8 continues once this level has fallen.

The particular method of filling hopper 15 with flowable, particulate solids illustrated in FIG. 3 is not critical to proper operation of the apparatus of the present invention. Thus, container 6 may be elevated and its contents dumped into hopper 15; hopper 15 may be filled at ground level and thereafter positioned on structural support 16; or solids may be conveyed from container 6 at ground level to elevated hopper 15 pneumatically or by the use of bucket elevators, continuous-flow or closed-belt conveyors, and the like. Other methods of filling hopper 15 with flowable, particulate solids will be apparent to those skilled in the art.

From hopper 15, flowable, particulate solids gravity-feed to single- and multi-measuring tube loading apparatuses 18 and 19, respectively, of the present invention through lines 17, 22, and 23. Loading apparatuses 18 and 19 are individually suspended from column-mounted jib cranes 20, which jib cranes are so positioned and of such length and swing as to permit locating either apparatus above any tube 4 in fluid-solid contacting device upper tubesheet 3. Loading apparatus 18 and 19 are moved across tubesheet 3 by trolley means 21, are raised or lowered by lifting means 32, and is rotated in a horizontal plane by swivel means 34. Both loading apparatuses may be semi-automatic and actuated by 15–100 psig air supplied via lines 10 and 26. Multi-tube loader 19 will be capable of simultaneously charging a plurality of reactor tubes 4. Single measuring tube loader 18 is employed to fill only one tube at a time, which tubes are generally located at or near the periphery of tubesheet 3. Depending on the length of tubes 4 and whether or not strata of flowable, particulate solids of varying concentration are to be loaded therein, measuring tubes 38 of variable volume may be employed. These measuring tubes may be fastened within the machine by studs and nuts, and thus be readily removable. As discussed in connection with FIGS. 1 and 2, the length, and, as a result, the volume of the measuring tubes may be adjusted by the use of a volume-varying collar, which fits onto the upper ends of the measuring tubes in a sleeve-like manner (not shown in FIG. 3) to assure the precise volume of their charge. By the use of suitable control elements, loading apparatuses 18 and 19 may be programmed to give any number of discharges per actuation, for example, from 1 to 10, by setting a cycle counter dial.

Once the movement of flowable, particulate solids to loading apparatuses 18 and 19 has begun, actual loading of vertical tubes 4 may be initiated. First, the loading apparatus will be positioned over tubes 4 to be filled and lowered to within about one-eighth inch of the top of tubesheet 3. Then, temporary reservoir flow control means 28, preferably pneumatically actuated pinch valves, will momentarily open and deposit a predetermined volume of flowable, particulate solids in, and on, measuring tubes 38, which will then be screeded, for example, by doctor blade assembly 39 as shown in FIG. 2. Thereafter, measuring tube flow control means 33, preferably pneumatically actuated pinch valves, will open and starve-feed the charge of flowable, particulate solids through outlet nozzles 31 into tubes 4. This loading cycle may be automatically repeated for as many times as has been set on a cycle counter. After one set of tubes has been loaded, the apparatus will be raised, moved to its next location, and the procedure repeated.

As noted hereinabove, during each cycle of loading, a portion of flowable, particulate solids will be screeded from the top of the measuring tubes 38. These solids will accumulate within overflow reservoir 37 until, at the operator's discretion, it is returned to hopper 15 through line 24, flow control means 30, line 54, recycle solids reservoir 14, air-actuated dump valve 52 and line 55. This is accomplished by pneumatically closing flow control means 29 thereby subjecting recycle receiver 14 to a vacuum, and opening flow control means 30. The bottom of recycle solids receiver 14 may be located somewhat higher than that of primary solids receiver 13, so that dump valve 52 therein will never be contacted by flowable, particulate solids accumulating in hopper 15, and, consequently, be shut off.

Locating a loading apparatus of the present invention and maintaining its position during the actual loading cycle will be assisted by locating detents 41, which nest in tubes adjacent to those being filled.

Normally it will be advisable to consider the placement of tubes 4 terminating at tubesheet 3. This will assist in determining the optinum number of measuring tubes with which loading apparatus 19 is to be equipped, as well as in determining the optimal pattern by which tubes 4 are to be loaded. Simultaneously with, or following, the loading of pluralities of tubes 4 by multi-measuring tube loader 19, single tube loader 18 is employed to fill tubes located on and near the periphery of tubesheet 3. Perforations in tubesheet 3 corresponding to tie rods, plugged tubes, or tubes to be hand-packed bacuse they contain thermocouples or otherwise, are covered with a suitable protective device, for example, a simple plate, while apparatuses 18 and 19 are being used to fill tubes 4. Any excess, flowable, particulate solids spilled onto tubesheet 3 are removed, for example by a suitable vacuum line, before the fluid-solid contacting device is started up.

When the particular processing operation effected in fluid-solid contacting device 1 requires that tubes 4 be filled with strata of flowable, particulate solids containing two or more species in varying concentrations, hopper 15 may be drained of solids by disconnecting lines 22 and 23 at loading apparatuses 18 and 19 and allowing the solids to fall into a suitable container through these lines. After loading machines 18 and 19 have also been emptied of solids, filling of hopper 15 with the material required in the next stratum will be started. Where tubes 4 are to be filled with strata of differing concentration and length, longer or shorter measuring tubes, as appropriate, may be installed in loading apparatuses 18 and 19 concurrently with the removal of flowable, particulate solids from the system. Where fluid-solid contacting device 1 is to be employed in a horizontal configuration, it may be loaded as hereinabove indicated and thereafter positioned.

We claim as our invention:

1. Apparatus for filing a vertical tube to a predetermined depth with a flowable, particulate solid which comprises
   a. a temporary storage reservoir for flowable, particulate solids;
   b. conveying means for supplying the temporary storage reservoir with flowable, particulate solids;
   c. an overflow reservoir supported by and vertically below the temporary storage reservoir;
   d. a temporary storage reservoir flow control means for regulating the quantity of flowable, particulate solids passing out of the temporary storage reservoir and into the overflow reservoir;
   e. at least one vertically oriented measuring tube secured to and passing through the bottom of the overflow reservoir, which measuring tubes are
      i. located beneath the temporary storage reservoir flow control means;
      ii. open at their upper ends for the receipt of flowable, particulate solids which pass through the temporary storage reservoir flow control means; and
      iii. restricted at their lower ends by a measuring tube flow control means, which comprises an outlet nozzle of variable, restricted flow area;
   f. screeding means for leveling the flowable, particulate solids within the measuring tube;
   g. positioning means for locating the outlet nozzle above the vertical tubes to be filled with flowable, particulate solids; and
   h. conveying means for removing excess flowable, particulate solids collected in the overflow reservoir.

2. The apparatus of claim 1 wherein the temporary storage reservoir flow control means and the measuring tube flow control means comprise pinch valves.

3. The apparatus of claim 1 wherein the screeding means comprises a doctor blade.

4. The apparatus of claim 1 wherein the positioning means comprise
   a. in ascending order above the temporary storage reservoir
      i. swivel and lifting means, for rotating the apparatus in a horizontal plane, and raising and lowering the apparatus, respectively; and
      ii. a trolley means suspended from a jib crane of such length and swing to permit location of the outlet nozzle above a vertical tube to be filled with flowable, particulate solids; and
   b. at least one vertically-oriented, locating detent, affixed to the bottom of the apparatus and extending downward at least to the horizontal plane formed by the ends of the outlet nozzles, which vertically oriented locating detents nest in tubes adjacent to those being filled with flowable, particulate solids.

5. The apparatus of claim 1 wherein the bottom of the overflow reservoir, to which the measuring tubes are sesured and through which they pass, is sloped from one side to its opposite side.

6. The apparatus of claim 1 wherein the bottom of the overflow reservoir, to which the measuring tubes are secured and through which they pass, is sloped from its center to its outer edges.

7. The apparatus of claim 1 wherein the variable, restricted flow area of the outlet nozzle attached to the measuring tube flow control means has a diameter no larger than that of the vertical tube to be filled with flowable, particulate solids.

8. In combination with the apparatus of claim 1, a volume-varying collar, which fits onto the upper ends of the measuring tubes in a sleeve like manner, said measuring tubes being raised or lowered with respect to the collar to achieve precise control of the length and the volume of the measuring tubes.

9. The apparatus of claim 1 wherein the measuring tubes are removable from the overflow reservoir.

10. The apparatus of claim 1 wherein a single, vertically oriented measuring tube is secured to and passes through the bottom of the overflow reservoir.

11. The apparatus of claim 1 wherein a plurality of measuring tubes, measuring tube flow control means, and outlet nozzles are secured to and pass through the bottom of the overflow reservoir, which outlet nozzles are arranged in a pattern identical to that of the vertical tubes to be filled with flowable, particular solids.

12. Apparatus for filling vertical tubes to a predetermined depth with a flowable, particulate solid which comprises
   a. two temporary storage reservoirs for flowable, particulate solids;
   b. conveying means for supplying the temporary storage reservoirs with flowable, particulate solids;
   c. two overflow reservoirs supported by and vertically below the two temporary storage reservoirs;
   d. a temporary storage reservoir flow control means for regulating the quantity of flowable, particulate solids passing out of the temporary storage reservoir and into the overflow reservoir;
   e. one vertically oriented measuring tube secured to and passing through the bottom of one overflow reservoir and a plurality of measuring tubes secured to and passing through the bottom of the other overflow reservoir, which measuring tube and tubes are
      i. located beneath the respective temporary storage reservoir flow control means;
      ii. open at their upper ends for the receipt of flowable, particulate solids which pass through the temporary storage reservoir flow control means; and
      iii. restricted at their lower ends by a measuring tube flow control means, which comprises an outlet nozzle of variable, restricted flow area;
   f. screeding means for leveling the flowable, particulate solids within the measuring tube;
   g. positioning means for locating the outlet nozzles above the vertical tubes to be filled with flowable, particulate solids; and
   h. conveying means for removing excess flowable, particulate solids collected in the overflow reservoirs.

* * * * *